US012594921B2

(12) United States Patent
Uhlig et al.

(10) Patent No.: US 12,594,921 B2
(45) Date of Patent: Apr. 7, 2026

(54) ELECTROMECHANICAL BRAKE PRESSURE GENERATOR INCLUDING AN ANTI-TWIST PROTECTION

(71) Applicant: Robert Bosch GmbH, Stuttgart (DE)

(72) Inventors: Martin Uhlig, Ilsfeld (DE); Sebastian Martin Reichert, Affaltrach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 18/549,240

(22) PCT Filed: Apr. 6, 2022

(86) PCT No.: PCT/EP2022/059051
§ 371 (c)(1),
(2) Date: Sep. 6, 2023

(87) PCT Pub. No.: WO2022/218768
PCT Pub. Date: Oct. 20, 2022

(65) Prior Publication Data
US 2024/0149854 A1 May 9, 2024

(30) Foreign Application Priority Data
Apr. 16, 2021 (DE) .................... 10 2021 203 804.2

(51) Int. Cl.
*B60T 13/66* (2006.01)
*B60T 13/58* (2006.01)
*B60T 13/74* (2006.01)

(52) U.S. Cl.
CPC .......... *B60T 13/745* (2013.01); *B60T 13/588* (2013.01)

(58) Field of Classification Search
CPC .... B60T 13/745; B60T 13/146; B60T 13/588; F16H 25/24
See application file for complete search history.

(56) References Cited

U.S. PATENT DOCUMENTS 9,174,620 B2 * 11/2015 Starr ...................... B60T 17/02
2020/0340560 A1 10/2020 Oehler et al.
(Continued)

FOREIGN PATENT DOCUMENTS

DE 102011007025 A1 10/2012
DE 102019205911 A1 10/2020
(Continued)

OTHER PUBLICATIONS

International Search Report for PCT/EP2022/059051, Issued Aug. 12, 2022.
(Continued)

*Primary Examiner* — Gonzalo Laguarda
(74) *Attorney, Agent, or Firm* — NORTON ROSE FULBRIGHT US LLP

(57) ABSTRACT

An electromechanical brake pressure generator for a hydraulic braking system of a vehicle. The brake pressure generator includes at least one threaded drive system including a spindle and a spindle nut, which cooperate via a thread, and an electromotive drive using which the spindle and the spindle nut are rotatable relative to one another. The brake pressure generator includes a hydraulic piston accommodated in a hydraulic cylinder of a piston/cylinder unit. An anti-twist protection is formed by a recess which extends in the axial direction and forms a sliding surface, and by a sliding element protruding into the recess, so that the hydraulic piston is secured against twisting and is axially displaceable by a rotation of the spindle. The sliding surface and/or a contact surface of the sliding element cooperating with the sliding surface includes a microprofiling, whose profiling direction is orthogonal to the movement of the hydraulic piston.

11 Claims, 3 Drawing Sheets

(56)                    References Cited

U.S. PATENT DOCUMENTS

| | | |
|---|---|---|
| 2020/0340563 A1 | 10/2020 | Boehm et al. |
| 2021/0018079 A1 | 1/2021 | Winkler et al. |

FOREIGN PATENT DOCUMENTS

| | | |
|---|---|---|
| DE | 102022200259 A1 | 7/2023 |
| JP | 2016223565 A | 12/2016 |
| JP | 2018189102 A | 11/2018 |
| JP | 2020046056 A | 3/2020 |
| WO | 2019020259 A1 | 1/2019 |

OTHER PUBLICATIONS

Yang, et al.: "Pose Estimation of six-axis Industrial Robots Based on Deep Learning," EITCE 2021 5th International Conference on Electronic Information Technology and Computer Engineering, China; United States: Association for Computing Machinery, (2021), pp. 836-839; ISBN 978-1-4503-8432-2. https://doi.org/10.1145/3501409.3501559.

* cited by examiner

ELECTROMECHANICAL BRAKE PRESSURE GENERATOR INCLUDING AN ANTI-TWIST PROTECTION

FIELD

The present invention relates to an electromechanical brake pressure generator for a hydraulic braking system of a vehicle. This electromechanical brake pressure generator includes, in particular, a threaded drive system for converting a drive-side rotary motion into a translatory motion for actuating the piston of a piston/cylinder unit.

BACKGROUND INFORMATION

The foot force of the driver is mostly not sufficient for braking motor vehicles, so that these are usually equipped with a brake booster. Conventional brake boosters in general operate with the aid of a vacuum generated by the internal combustion engine. The pressure difference between the engine pressure and the ambient pressure is used in the process to apply a boosting force onto the piston rod of the piston/cylinder unit, in addition to the foot force of the driver.

Alternative brake pressure buildup devices are needed for future drive concepts of motor vehicles since a vacuum is no longer available to operate a conventional vacuum brake booster. For this purpose, the electromechanical brake pressure generators of interest here were developed.

The actuating force at the master brake cylinder is generated with the aid of an electric motor. Such electromechanical brake pressure generators may not only be used to provide an auxiliary force, but in brake by wire systems also to be used as the sole provider of the actuating force. Electromechanical brake pressure generators are thus of advantage, in particular, with respect to autonomous driving.

German Patent Application No. DE 10 2019 205 911 A1 describes an electromechanical brake pressure generator for a hydraulic braking system of a vehicle. The electromechanical brake pressure generator includes a threaded drive system, which includes a spindle and a spindle nut. Together with the housing, the spindle nut forms an anti-twist protection, which is formed of a torque support of the spindle nut engaging in an axial recess in the housing. The spindle nut is secured against twisting via the anti-twist protection. During the rotation of the spindle, the torque support moves in the axial direction in the recess.

It is an object of the present invention to provide an electromechanical brake pressure generator including a threaded drive system which has a longer service life.

To achieve the object, an electromechanical brake pressure generator including a threaded drive system having features of the present invention is provided. The object is additionally achieved by a method for manufacturing such an electromechanical brake pressure generator. Advantageous refinements and embodiments of the present invention are disclosed herein.

SUMMARY

The present invention provides an electromechanical brake pressure generator for a hydraulic braking system of a vehicle. According to an example embodiment of the present invention, the electromechanical brake pressure generator includes at least one threaded drive system for converting a drive-side rotary motion into a translatory motion for the brake pressure generation, including a piston/cylinder unit, which includes a hydraulic piston, actuatable by the threaded drive system for the brake pressure generation. The threaded drive system includes a spindle and a spindle nut, which cooperate via a thread, and includes an electromotive drive, with the aid of which the spindle and the spindle nut are rotatable relative to one another.

The hydraulic piston is accommodated in a hydraulic cylinder of the piston/cylinder unit, creating an anti-twist protection. The anti-twist protection is formed by a recess extending in the axial direction and forming a sliding surface, and by a sliding element protruding into the recess, so that the hydraulic piston is secured against twisting and is axially displaceable by a rotation of the spindle.

A threaded drive system within the scope of the present invention shall be understood to mean both a pure spindle drive, in which the spindle nut is in direct contact with the spindle, and a ball screw. A ball screw is a helical gear including balls inserted between the spindle and the spindle nut. Both parts have a helical groove, which together form a helical tube filled with balls. The form-locked connection in the thread transverse to the helical line does not take place between the thread groove and tongue, as is the case with the pure spindle drive, but with the aid of the balls.

Within the meaning of the present invention, a twisting shall be understood to mean a rotary motion about an axial axis of the spindle nut. With the rotation of the driven spindle, the spindle nut is accordingly axially displaceable, so that the rotary motion of the electric motor or of the spindle may be converted into a translatory motion of the spindle nut. The anti-twist protection is situated at a radial area or an outer circumferential surface of the spindle nut.

According to an example embodiment of the present invention, the sliding surface and/or a contact surface of the sliding element cooperating with the sliding surface has/have a microprofiling, whose profiling direction is designed orthogonal to the movement of the hydraulic piston.

A microprofiling shall be understood to mean a structure which differs from a planar surface in an order of magnitude of micrometers. As a result, the microprofiling causes elevations and recesses to be formed on the contact surface or the sliding surface. The elevations and recesses are not selectively provided in the process, but extend steadily over at least a subarea of the contact surface. The extension direction of an elevation or a recess of the microprofiling is designed orthogonal to the axial movement direction or in the radial direction with respect to the spindle nut.

As a result of the microprofiling, at least one converging gap is formed between the sliding surface and the contact surface in the movement direction. An area situated ahead of an elevation in the movement direction thus serves as a lubricant reservoir. As a result of the lubricant reservoir, a lubricating film may already be formed between the sliding surface and the contact surface within a short travel of the spindle nut. Additionally, the lubricant reservoir ensures that the lubricating film does not rupture. This allows the solid friction between the sliding surface and the contact surface to be overcome quickly. The wear is thus suppressed, or at least decreased, and the service life of such an electromechanical brake pressure generator is consequently increased. The force for moving the spindle nut is also reduced.

In one advantageous embodiment of the present invention, the sliding element includes a contact shoe, which forms the contact surface and which is applied to the sliding element and situated at least in the area toward the sliding surface. The contact shoe is preferably made of a material different from the hydraulic piston. The contact shoe preferably completely surrounds the sliding element. As a result of the contact shoe, the material of the hydraulic piston may be selected regardless of sliding properties. The material of the contact shoe is advantageously selected in such a way that good sliding pairing is ensured between the material of the sliding surface and that of the contact shoe. As a result, the wear may be further reduced so that the service life and the efficiency are increased.

In one preferred example embodiment of the present invention, the contact shoe is made of a plastic material. In this way, an arbitrary shape is easily manufacturable. Such a contact shoe may be implemented easily and economically. In addition, plastic material is light and cost-effective. In the field of plastic materials, there is also a large selection of plastic materials having specific properties, so that a suitable plastic material is locatable for the intended use. Possible materials are, amongst others, polyoxymethylene (POM), polyether ether ketone (PEEK), and polyamide (PA). With the aid of 2-component plastic materials, moreover the favorable tribological properties of a material may be combined with the favorable strength properties of another material.

In one further preferred example embodiment of the present invention, the contact surface and/or the sliding surface of the recess has/have a wave structure. In the process, the wave structure preferably extends over the entire radial height of the contact and/or sliding surface. As a result of the wave structure, a steady progression of the profiling is formed, for example in the form of a parabola, so that a swirl of the lubricant in the area of the profiling is avoided. In this way, it is avoided that the lubricant film ruptures due to such a swirl. In this way, a permanent lubricant film is ensured so that the wear may be decreased. Furthermore, sufficient lubricant reservoirs are ensured, even with larger axial lengths and/or translatory paths of the sliding elements.

The height of the wave structure is limited toward the bottom by the roughness of the contact surface and the sliding surface. The upper limit of the wave structure is dependent on the specific embodiment of the waviness and the axial length of the sliding element onto which the waviness is applied. The design may take place with the aid of fluid/tribology simulation.

The wave structure preferably includes at least one wave having a height between 5 µm and 500 µm. The waves particularly preferably have a height between 10 µm and 100 µm. It has been found that waves at this height achieve a sufficient effect for forming a lubricant reservoir. Additionally, this height ensures that no rupture of the lubricant or a swirl, due to a turbulent flow, occurs. Such a height may thus ensure the above-described advantages. In particular, instead of one wave, it is also possible for multiple waves to be formed so that lubricant reservoirs are formed between the waves or in the wave valleys.

In one alternative specific embodiment of the present invention, the sliding surface is formed by insert parts, which are introduced into the recess. In this way, the microprofiling may be applied onto the sliding surface in a simple manner. The insert part is preferably made of a plastic material. In this way, the above-described advantages may be implemented by profiling of the sliding surface.

The object of the present invention may additionally be achieved by a method for manufacturing such an electromechanical brake pressure generator. According to an example embodiment of the present invention, the method includes the steps of forming recesses, extending in the axial direction, including sliding surfaces, the recesses, together with the sliding element, forming an anti-twist protection.

The method is characterized in that a microprofiling is formed at the contact surface of the sliding element and/or of the sliding surface. As a result of such a design of a microprofiling, essentially the above-described advantages are achieved.

Preferably, a contact shoe is applied onto the sliding element. The microprofiling is preferably formed at the contact shoe by way of injection molding. In this way, the microprofiling is already integrally formed at the injection molding tool. This has the advantage that no further work steps are necessary for creating the microprofiling.

In one further advantageous specific embodiment of the present invention, the microprofiling is formed by post-processing of the contact surface. The microprofiling is thus formed by a further work step. As a result, the manufacturing process does not have to be changed considerably. In addition, for example, the injection mold does not have to be replaced.

According to one advantageous embodiment of the present invention, the microprofiling is formed by elastic deformation of the contact shoe when the contact shoe is applied onto the sliding element. In the process, the sliding element has slightly larger outer dimensions in a predefined direction. The contact shoe is thus widened in a certain direction, so that an outer contour of the contact shoe also changes minimally. In this way, a subsequent processing may be dispensed with.

The present invention furthermore provides a vehicle including an electromechanical brake pressure generator for a hydraulic braking system. Such a vehicle allows the advantages described with respect to the electromechanical brake pressure generator to be achieved. In one preferred embodiment of the present invention, this vehicle may be an automated or completely autonomous vehicle.

Exemplary embodiments of the present invention are shown in the figures and are described in greater detail in the following description.

DETAILED DESCRIPTION OF EXAMPLE EMBODIMENTS

Figure 1:
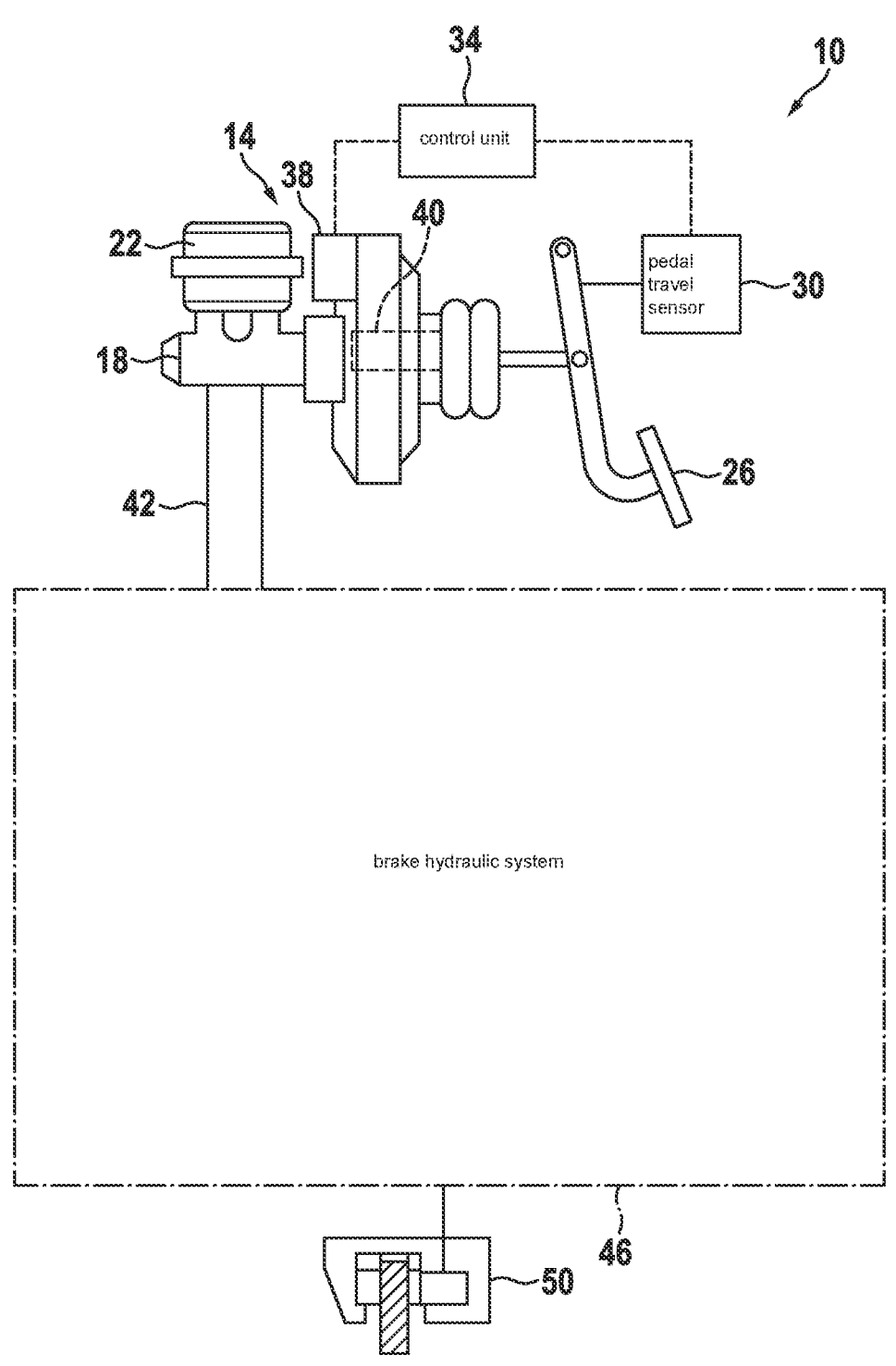
FIG. 1 shows a schematic illustration of a hydraulic braking system for a vehicle including an electromechanical brake pressure generator.

FIG. 1 shows a schematic illustration of a hydraulic braking system 10 for a vehicle including an electromechanical brake pressure generator 14. Hydraulic braking system 10 includes electromechanical brake pressure generator 14. This brake pressure generator 14 includes a piston/cylinder unit 18 which is supplied with brake fluid via a brake fluid reservoir 22.

Piston/cylinder unit 18 may be activated by a brake pedal 26 actuated by the driver, and the resulting brake pedal travel is measured by a pedal travel sensor 30 and forwarded to a control unit 34. Even though FIG. 1, in principle, shows a brake booster, it is essential here that the brake pedal travel is measured by pedal travel sensor 30. A brake pressure generation without a brake pedal travel is also possible, so that the vehicle is also brakable in the autonomous driving state.

Based on the measured brake pedal travel, control unit 34 generates a control signal for an electric motor 38 of brake pressure generator 14. Electric motor 38, which is connected to a gearbox (not shown) of brake pressure generator 14, boosts the braking force input by brake pedal 26 within the scope of a decoupled system in accordance with the control signal. For this purpose, a threaded drive system 40 situated in brake pressure generator 14 is activated by electric motor 38 in accordance with the actuation of brake pedal 26 so that the rotary motion of electric motor 38 is converted into a translatory motion.

With the aid of brake pressure generator 14, the brake fluid present in piston/cylinder unit 18 is pressurized by the actuation of brake pedal 26. This brake pressure is forwarded to a brake hydraulic system 46 via brake lines 42. Brake hydraulic system 46, which is only shown as a box here, is formed by various valves and other components for forming a, for example, electronic stability program (ESP). Brake hydraulic system 46 is additionally connected to at least one wheel brake unit 50 so that a braking force may be applied to wheel brake unit 50 by a corresponding switching of valves.

Figure 2:
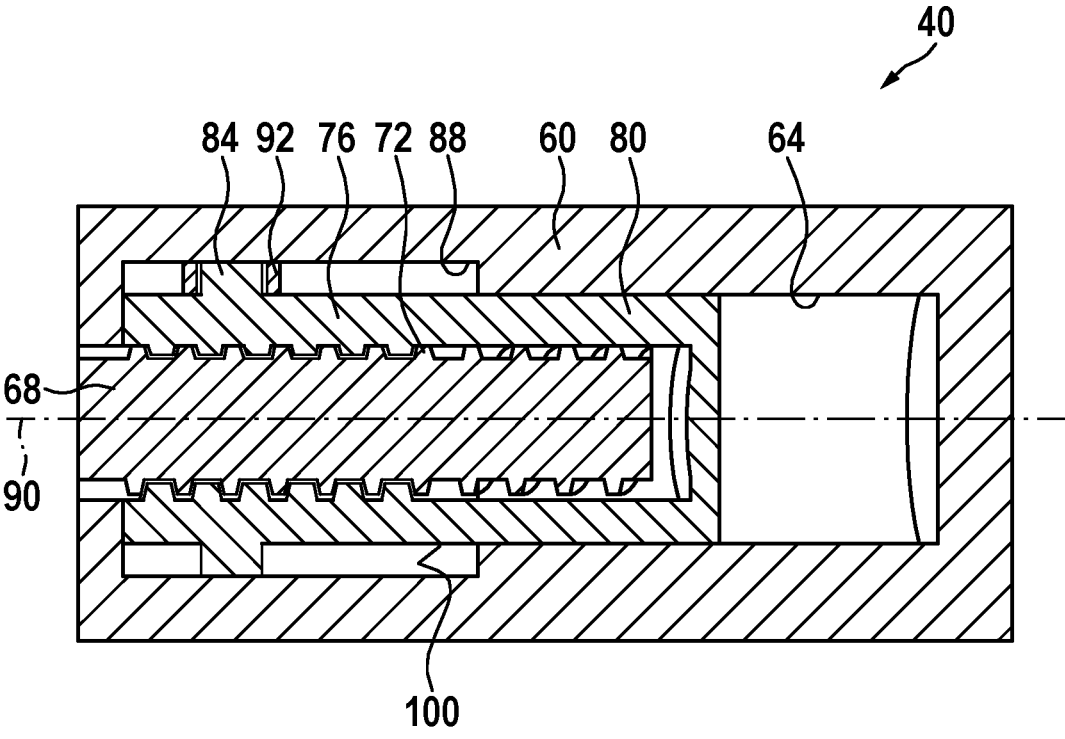
FIG. 2 shows a longitudinal sectional illustration of one exemplary embodiment of a threaded drive system according to the present invention of the electromechanical brake pressure generator.

FIG. 2 shows a longitudinal sectional illustration of one exemplary embodiment of a threaded drive system 40 according to the present invention of electromechanical brake pressure generator 14. Threaded drive system 40 includes a housing 60, which forms a pot-shaped hydraulic cylinder 64. In this exemplary embodiment, housing 60 is made of metal. In addition, threaded drive system 40 includes a spindle 68, which is drivable with the aid of electric motor 38 shown in FIG. 1 so that spindle 68 carries out a rotary motion.

A spindle nut 76, which is in engagement with thread 72 of spindle 68, is situated at a thread 72 of spindle 68. The spindle nut forms a one-piece hydraulic piston 80 situated coaxially with respect to spindle nut 76. In addition, two sliding elements 84 are formed in one piece with spindle nut 76, which cooperate with axial recesses 88 in housing 60 and form the anti-twist protection. Above a center line 90, an embodiment is shown in which sliding element 84 includes a contact shoe 92, which is situated on the outer side and, via a contact surface 96 (shown in FIG. 3), is in sliding contact with a sliding surface 100 formed in recess 88. Below center line 90, an embodiment of sliding element 84 without contact shoe 92 is shown. Contact surface 96 is formed at sliding element 84 in the process.

As a result of anti-twist protection 84, 88, spindle nut 76 is secured against twisting. An axial length of sliding element 84 is considerably smaller than an axial length of recesses 88. As a result, spindle nut 76 is axially displaceable by a rotation of spindle 68.

Figure 3:
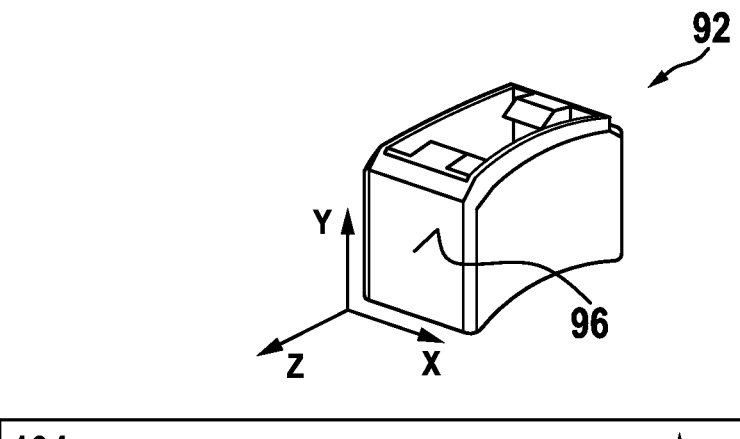
FIG. 3 shows a perspective view of one exemplary embodiment of a contact shoe.
Figure 3:
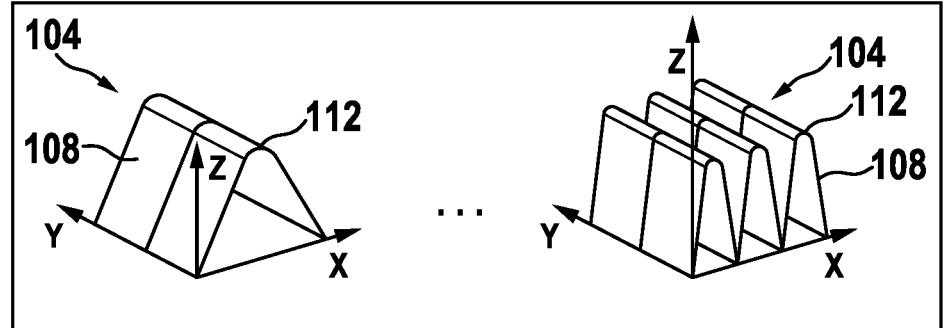

FIG. 3 shows a perspective view of an exemplary embodiment of the contact shoe. This figure, in particular, shows contact surface 96 of contact shoe 92, which includes a microprofiling 104. Since microprofiling 104 is only designed in the μm range, microprofiling 104 is not apparent on contact surface 96 itself. A coordinate system is shown with respect to contact surface 96, which has the zero point at a lower left corner of contact surface 96. The x-axis extends in recess 88 in the axial movement direction of sliding element 84. The y-axis indicates a direction which extends orthogonal to the movement direction and, at the same time, corresponds to a radial direction of spindle nut 76. A height of microprofiling 104 is provided by the z-axis.

Below contact shoe 92, two exemplary embodiments for a progression of microprofiling 104 on contact surface 96 are shown by way of example. It is apparent in the process that microprofiling 104 has a wave structure. In the left graph, only a single wave 108 is formed. In this way, a gap between sliding surface 100 of recess 88 and contact shoe 92 is decreased at a wave peak 112. During a movement in the axial direction of sliding element 84, the lubricant thus builds up more quickly between contact shoe 92 and sliding surface 100 ahead of wave peak 112. As a result, the lubricant flow in the area of wave peak 112 is already provided after a short movement of sliding element 84 so that the solid friction between contact shoe 92 and sliding surface 100 is overcome. The friction and the wear are thus considerably reduced.

In a t graph on the right, FIG. 3 shows a microprofiling 104 including, for example, three waves 108, which are formed on contact surface 96 of contact shoe 92. In the process, essentially the same effect is achieved as in the left graph. In addition, a lubricant reservoir is provided between waves 108, with the aid of which the lubricant may be stored and the solid friction may be quickly overcome.

In one exemplary embodiment not shown here, microprofiling 104 shown in FIG. 3 may also be applied over the entire axial length of sliding surface 100 formed in recess 88. In other words, a plurality of waves 108 are applied onto sliding surfaces 100. In this way, the same effects are achieved as in the case of contact surface 96, so that the wear of the anti-twist protection 84, 88 is reduced, and the service life is extended.

Figure 4:
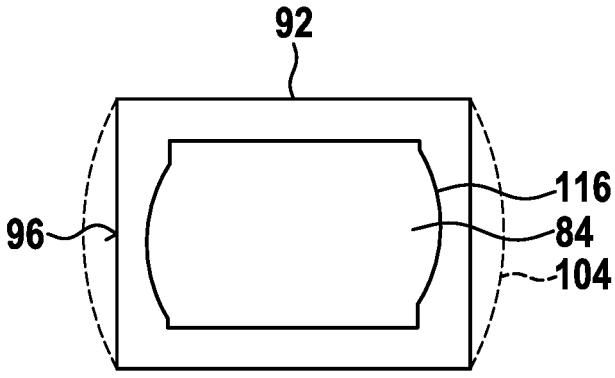
FIG. 4 shows a top view onto one exemplary embodiment of a sliding element including a contact shoe.

FIG. 4 shows a top view onto one exemplary embodiment of sliding element 84 including a contact shoe 92. In this exemplary embodiment, sliding element 84 includes a convex area 116, shown exaggerated here, toward both contact surfaces 96. A contact shoe 92, which is made of a soft material, is applied onto sliding element 84. In the process, contact shoe 92 has a shape including smooth contact surfaces 96. Due to the soft material, even an application of contact shoe 92, due to a compression of the soft material in convex area 116, does not result in a direct formation of a convex shape. However, under loading at sliding surface 100, this causes the compression in convex area 116 to be reduced, and an action of contact surfaces 96 to arise, as is shown exaggerated with dotted lines in the figure. In this way, a microprofiling 104 including a wave is generated, thereby achieving the aforementioned advantages.

What is claimed is:

1. An electromechanical brake pressure generator for a hydraulic braking system of a vehicle, comprising:

at least one threaded drive system configured to convert a drive-side rotary motion into a translatory motion; and a piston/cylinder unit including a hydraulic piston, actuatable by the threaded drive system for brake pressure generation, the threaded drive system including a spindle and a spindle nut, which cooperate via a thread, and an electromotive drive using which the spindle and the spindle nut are rotatable relative to one another, wherein the hydraulic piston is accommodated in a hydraulic cylinder of the piston/cylinder unit which forms an anti-twist protection, the anti-twist protection being formed by a recess which extends in an axial direction and forms a sliding surface, and by a sliding element protruding into the recess, so that the hydraulic piston is secured against twisting and is axially displaceable by a rotation of the spindle;

wherein the sliding surface and/or a contact surface of the sliding element cooperating with the sliding surface includes a microprofiling, whose profiling direction is orthogonal to a movement of the hydraulic piston.

2. The electromechanical brake pressure generator as recited in claim 1, wherein the sliding element includes a contact shoe, which forms the contact surface and is applied onto the sliding element and situated at least in an area toward the sliding surface.

3. The electromechanical brake pressure generator as recited in claim 2, wherein the contact shoe is made of a plastic material.

4. The electromechanical brake pressure generator as recited in claim 1, wherein the contact surface and/or the sliding surface of the recess includes a wave structure.

5. The electromechanical brake pressure generator as recited in claim 4, wherein the wave structure includes at least one wave having a height between 5 μm and 500 μm.

6. A method for manufacturing an electromechanical brake pressure generator, the electromechanical brake pressure generator including:

at least one threaded drive system configured to convert a drive-side rotary motion into a translatory motion, and a piston/cylinder unit including a hydraulic piston, actuatable by the threaded drive system for brake pressure generation, the threaded drive system including a spindle and a spindle nut, which cooperate via a thread, and an electromotive drive using which the spindle and the spindle nut are rotatable relative to one another, wherein the hydraulic piston is accommodated in a hydraulic cylinder of the piston/cylinder unit which forms an anti-twist protection, the anti-twist protection being formed by a recess which extends in an axial direction and forms a sliding surface, and by a sliding element protruding into the recess, so that the hydraulic piston is secured against twisting and is axially displaceable by a rotation of the spindle;

the method comprising the following steps:

forming recesses which extend in an axial direction and include sliding surfaces, the recesses together with the sliding element forming an anti-twist protection; and forming a microprofiling at the contact surface of the sliding element and/or the sliding surface of the recesses.

7. The method as recited in claim 6, wherein a contact shoe is applied onto the sliding element.

8. The method as recited in claim 7, wherein the microprofiling at the contact shoe is formed by injection molding.

9. The method as recited in claim 6, wherein the microprofiling is formed by post-processing of the contact surface.

10. The method as recited in claim 7, wherein the microprofiling is formed by elastic deformation of the contact shoe during the application of the contact shoe onto the sliding element.

11. A vehicle, comprising:

an electromechanical brake pressure generator for a hydraulic braking system, the electromechanical brake pressure generator including:

at least one threaded drive system configured to convert a drive-side rotary motion into a translatory motion; and a piston/cylinder unit including a hydraulic piston, actuatable by the threaded drive system for brake pressure generation, the threaded drive system including a spindle and a spindle nut, which cooperate via a thread, and an electromotive drive using which the spindle and the spindle nut are rotatable relative to one another, wherein the hydraulic piston is accommodated in a hydraulic cylinder of the piston/cylinder unit which forms an anti-twist protection, the anti-twist protection being formed by a recess which extends in an axial direction and forms a sliding surface, and by a sliding element protruding into the recess, so that the hydraulic piston is secured against twisting and is axially displaceable by a rotation of the spindle;

wherein the sliding surface and/or a contact surface of the sliding element cooperating with the sliding surface includes a microprofiling, whose profiling direction is orthogonal to a movement of the hydraulic piston.

* * * * *